(12) United States Patent
Zientarski (10) Patent No.: US 9,181,797 B2
(45) Date of Patent: Nov. 10, 2015

(54) DOWNHOLE TELEMETRY SIGNALLING APPARATUS

(76) Inventor: Mariusz Thomas Zientarski, Edmonton (CA)

(*) Notice: Subject to any disclaimer, the term of this patent is extended or adjusted under 35 U.S.C. 154(b) by 294 days.

(21) Appl. No.: 13/552,924

(22) Filed: Jul. 19, 2012

(65) Prior Publication Data

US 2013/0063276 A1 Mar. 14, 2013

Related U.S. Application Data (60) Provisional application No. 61/559,402, filed on Nov. 14, 2011.

(30) Foreign Application Priority Data

Jul. 19, 2011 (CA) ..................................... 2746875

(51) Int. Cl.
*E21B 47/12* (2012.01)
*H04B 13/02* (2006.01)

(52) U.S. Cl.
CPC ............... *E21B 47/12* (2013.01); *E21B 47/122* (2013.01); *H04B 13/02* (2013.01)

(58) Field of Classification Search
CPC ............................... E21B 47/122; E21B 47/12
USPC .......... 340/854.4, 854.5, 854.3, 853.1, 853.7, 340/856.3
See application file for complete search history.

(56) References Cited

U.S. PATENT DOCUMENTS

| | | | |
|---|---|---|---|
| 2,354,887 A | 8/1944 | Silverman et al. | |
| 2,389,241 A | 11/1945 | Silverman | |
| 3,186,222 A * | 6/1965 | Martin | ....................... 340/853.7 |
| 6,614,360 B1 | 9/2003 | Leggett, III et al. | |
| 6,781,521 B1 | 8/2004 | Gardner et al. | |
| 7,035,165 B2 | 4/2006 | Tang | |
| 7,084,782 B2 | 8/2006 | Davies et al. | |
| 2008/0198375 A1* | 8/2008 | DiFoggio | ....................... 356/301 |
| 2010/0065329 A1* | 3/2010 | Zientarski | ....................... 175/24 |
| 2012/0218863 A1* | 8/2012 | Chau et al. | ....................... 367/82 |

* cited by examiner

*Primary Examiner* — Andrew Bee
(74) *Attorney, Agent, or Firm* — Ostrolenk Faber LLP (57) ABSTRACT

A well-bore downhole data logging signal transmission apparatus having: a signal transmitter at a drill bit on a drill string; a receiver at a drill bore head, a generator places a carrier current on the drill string with the drill bit; the transmitter places signal pulses; the receiver senses the pulses; the pulses have a duration less than 10 ms.

21 Claims, 5 Drawing Sheets

DOWNHOLE TELEMETRY SIGNALLING APPARATUS

This application claims the benefit under 35 USC 120 of U.S. Provisional patent application Ser. No. 61/559,402 filed Nov. 14, 2011, and claims also claims the benefit under 35 USC 119 of Canadian Patent Application 2,746,875 filed Jul. 19, 2011, the specifications and drawings of those applications being incorporated herein by reference.

FIELD OF THE INVENTION

This invention relates to the field of downhole telemetry apparatus, and methods of use of such apparatus.

BACKGROUND

The determination of the location of a distant subterranean object may be of considerable commercial importance in the fields of well drilling, tunnel boring, pipeline laying under rivers or other surface obstructions, hard rock mining, and so on. In hydrocarbon extraction, a drill string may be 3 to 6 inches in diameter, and yet may extend many thousands of feet into the ground. Given the non-homogeneity of the underlying geological structure, and the tendency for drill bits to wander, it may be difficult to know with reasonable accuracy where the drill bit may be. This issue may tend to have enhanced importance in the context of, for example, directional drilling, where it may be desired to follow a relatively narrow and possibly undulating geological feature, such as a coal seam, a hydrocarbon pay zone for oil or gas extraction, an ore vein or pipe, such as a kimberlite pipe from which a mineral or other resource is to be extracted, or the boring of a utility conduit in an urban area.

There are known methods of addressing these issues, sometimes termed borehole telemetry. A typical system might involve magnetic sensors that indicate azimuth angle (i.e., compass direction relative to North) and angle of dip. Gyroscopic (i.e., inertial) and magnetic sensors have been used for some time. Adjustments in drilling may occur on the basis of these signals. It may also be noted that while borehole telemetry may pertain to the absolute position of a drill head, it may also refer to, and have significant commercial importance in relation to, the relative position of one bore hole to another, as in steam assisted gravity drainage (SAGD) or of bore position relative to a geological boundary structure.

Most typically, MWD tools are deployed to measure the earth's gravity and magnetic field to determine the inclination and azimuth. Knowledge of the course and position of the wellbore depends entirely on these two angles. Under normal operating conditions, the inclination measurement accuracy is approximately plus or minus 0.2 degrees. Such an error translates into a target location uncertainty of about 3.0 meters per 1000 meters along the borehole. Additionally, dip rate variations of several degrees are common.

Commentary on downhole telemetry is also provided in U.S. Pat. No. 6,781,521, of Gardner et al., which issued on Aug. 24, 2004 in the context of transmitting downhole data to the surface during measurement while drilling (MWD) (See col. 1, line 46 to col. 2, line 57, in part as follows).

"At present, there are four major categories of telemetry systems that have been used in an attempt to provide real time data from the vicinity of the drill bit to the surface; namely, mud pressure pulses, insulated conductors, acoustics and electromagnetic waves."

"In a mud pressure pulse system, the resistance of mud flow through a drill string is modulated by means of a valve and control mechanism mounted in a special drill collar near the bit. This type of system typically transmits at 1 bit per second as the pressure pulse travels up the mud column at or near the velocity of sound in the mud. It is well known that mud pulse systems are intrinsically limited to a few bits per second due to attenuation and spreading of pulses."

"Insulated conductors, or hard wire connection from the bit to the surface, is an alternative method for establishing downhole communications. This type of system is capable of a high data rate and two way communication is possible. It has been found, however, that this type of system requires a special drill pipe and special tool joint connectors which substantially increase the cost of a drilling operation. Also, these systems are prone to failure as a result of the abrasive conditions of the mud system and the wear caused by the rotation of the drill string."

"Acoustic systems have provided a third alternative. Typically, an acoustic signal is generated near the bit and is transmitted through the drill pipe, mud column or the earth. It has been found, however, that the very low intensity of the signal which can be generated downhole, along with the acoustic noise generated by the drilling system, makes signal detection difficult. Reflective and refractive interference resulting from changing diameters and thread makeup at the tool joints compounds the signal attenuation problem for drill pipe transmission."

"The fourth technique used to telemeter downhole data to the surface uses the transmission of electromagnetic waves through the earth. A current carrying downhole data signal is input to a toroid or collar positioned adjacent to the drill bit or input directly to the drill string. When a toroid is utilized, a primary winding, carrying the data for transmission, is wrapped around the toroid and a secondary is formed by the drill pipe. A receiver is connected to the ground at the surface where the electromagnetic data is picked up and recorded. It has been found, however, that in deep or noisy well applications, conventional electromagnetic systems are unable to generate a signal with sufficient intensity to be recovered at the surface."

"In general, the quality of an electromagnetic signal reaching the surface is measured in terms of signal to noise ratio. As the ratio drops, it becomes more difficult to recover or reconstruct the signal. While increasing the power of the transmitted signal is an obvious way of increasing the signal to noise ratio, this approach is limited by batteries suitable for the purpose and the desire to extend the time between battery replacements. It is also known to pass band filter received signals to remove noise out of the frequency band of the signal transmitter. These approaches have allowed development of commercial borehole electromagnetic telemetry systems which work at data rates of up to four bits per second and at depths of up to 4000 feet without repeaters in MWD applications. It would be desirable to transmit signals from deeper wells and with much higher data rates which will be required for logging while drilling, LWD, systems."

The problem of transmitting encoded data by acoustic signals is also discussed in U.S. Pat. No. 6,614,360 of Leggett et al., issued Sep. 2, 2003, who suggest that much preliminary data processing may occur downhole (See col. 3, line 60 to col. 4, line 30).

The art discusses efforts to address the downhole signal strength or signal attenuation issue either by using acoustic repeaters, or by filtering out, or cancelling out either acoustic or EM noise. U.S. Pat. No. 6,781,521 of Gardner appears to be fairly sophisticated in this regard. Techniques of the nature of those described by Gardner tend to be directed toward the problem of identifying a signal where the signal to noise ratio is very small, perhaps of the order of a few thousandths.

SUMMARY OF THE INVENTION

In an aspect of the invention there is a telemetry apparatus that has an internal power source as in conventional electromagnetic systems, be it a battery or a generator, that is a part of the downhole MWD tool. The telemetry apparatus places coded time-wise spaced pulses of high voltage, short duration charges on the drill string, for decoding at the well-head. The system takes advantage of the leakage of charge from the drill string into the surrounding geological formation in the waiting period between pulses defined by the times-wise spacing of the pulses.

In an aspect of the invention there is a telemetry apparatus for a drilling rig, the drilling rig having a drill string extending between a well head and a drill bit down a well bore formed in a geological formation. The telemetry apparatus includes a telemetry module locatable in a drill string adjacent to a drill bit, and one of (a) an electrical signal source operable to emit an electrical signal, that signal source being located and operably connected to pass the signal into the drill string; and the telemetry module including apparatus operable to encode an information carrying signal onto the electrical signal; and (b) a receiving station located at the well head and operably connected to monitor signals received on the drill string.

That aspect of the invention may include the additional feature of at least one repeater station mounted on the drill string intermediate the signal generator and the receiver, the number of repeater stations being proportionate to, and suitable for, the distance between the signal generator and the wellhead.

In another feature of that aspect of the invention, the apparatus includes a decoder located distant from the telemetry module, the decoder being connected to observe the encoded information carrying signal transported by the drill string. In still another feature, the telemetry module includes batteries, the batteries providing a power source used in generating the information carrying signal. In another feature the overall power consumption of the signal generator in operation is less than 5 w.

In another aspect of the invention, there is a well-bore downhole data logging signal transmission apparatus. It has a signal transmitter sub mounted to an electrically conductive drill string adjacent to a drill bit thereof, and a receiver, or voltage potential detector, or charge detector, mounted at a drill bore head location. The signal transmitter is operatively connected to place coded electrical signal pulse sequences on the electrically conductive drill string. The receiver mounted in operative connection to sense the presence of transmitted electrical pulses. The signal transmitter being operable to cause pulses having a peak voltage of greater than 1000 V and a duration of less than 10 ms on the drill string.

In a feature of that aspect of the invention, the apparatus includes sensors for observing any of (a) compass direction; (b) azimuth angle; (c) temperature; (d) acidity; (e) salinity; and the signal transmitter sub being operable to send data obtained from any of the sensors. In another feature the apparatus emits a pulse train having a mean power consumption of less than 5 w. In a still further feature, the apparatus has a power consumption of between 0 and 2.5 w. In yet another feature, the signal transmitter is operable to release a charged signal onto the drill string, the charged signal having a peak voltage in the range of 2000V to 20,000 V. In still another feature, the charges signal has a pulse time duration of less than 5 ms. In yet still a further feature the apparatus includes at least one signal repeated mounted along the drill string intermediate the signal transmitter and the signal receiver. In still another feature the signal transmitter has a baud rate in the range of 20 to 200 pulses per second.

In another feature, there is a method of transmitting wellbore down hole data. That method includes using any of the foregoing apparatus to transmit data from the signal transmitter to the receiver. In another feature, the method includes spacing pulses of data, the spacing including inhibiting transmission of a subsequent pulse until electrical voltage potential on an the drill string next adjacent to the signal transmitter has decayed to less than 37% of the peak voltage. In still another feature the method includes inhibiting transmission of subsequent pulses until voltage potential on the drill string next adjacent to the signal transmitter has fallen to less than 13.5% of the peak voltage. In yet still another further feature the method includes inhibiting transmission of subsequent pulses until voltage potential on the drill string next adjacent to the signal transmitter has fallen to less than 5% of the peak voltage.

In another aspect of the invention there is a method of transmitting downhole an electrical signal carrying downhole telemetry information from a telemetry sending apparatus located near a drill bit of a drill string, the drill bit being downhole in a well bore formed in a geological formation. The signal is sent from the sending apparatus to a location near a well head of the well bore. The method includes establishing a carrier current in the drill string, and superposing the electrical signal on the carrier current.

In another feature of that aspect of the invention, the carrier current has a current magnitude that is more than 100 times as large as the peak current magnitude of the electrical signal. In another feature the carrier current has a value of greater than 0.5 amps. In still another feature the method includes employing a power supply adjacent to the well head to supply power for the carrier current. In a still further feature, the method includes building up a stored charge in the geological formation adjacent to the drill bit. In yet another feature the method includes discharging the geological formation through the drill string, and placing the electrical signal on an electrical discharge current associated with that discharge.

In another aspect of the invention there is a method of obtaining data from a signal sending device in a downhole location in a well bore, wherein the signal sending device has an electrical signal generator, and the method includes providing power from a source remote from the downhole location to facilitate transmission from the signal sending device.

In still another aspect of the invention there is an apparatus for enhancing an electrical signal from a downhole telemetry tool. The apparatus is located in a well bore distant from the well head. The apparatus includes a signal sending tool mounted adjacent to a drill bit in a drill string and a power source located nearer to the well head than to the drill bit. The power source is operable to provide power to facilitate transmission of a signal from the signal sending tool to the well head.

In another aspect of the invention there is a downhole telemetry apparatus that includes a signal source connected to place a series of controlled duration electrical charge pulses on a drill string, and apparatus mounted to detect ringing in the drill string caused by such pulses. In a feature of that aspect of the invention, the signalling apparatus includes a coil connected to conduct the pulses onto the drill string. In another feature the system forms and LRC decaying resonance system. In another aspect or feature of the invention includes the operation of such a system by imposing a train of pulses on such drill string, and sensing the ringing in the natural frequencies of the drill string associated with such a train of pulses.

BRIEF DESCRIPTION OF THE ILLUSTRATIONS

The various aspects and features of the invention may be explained and understood with the aid of the accompanying illustrations, in which.

DETAILED DESCRIPTION

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale.

The terminology used in this specification is thought to be consistent with the customary and ordinary meanings of those terms as they would be understood by a person of ordinary skill in the art in North America. While not excluding interpretations based on other sources that are generally consistent with the customary and ordinary meanings of terms or with this specification, or both, the Applicant expressly excludes all interpretations that are inconsistent with this specification, and, in particular, expressly excludes any interpretation of the claims or the language used in this specification such as may originate in the USPTO, or in any other Patent Office, unless supported by this specification or by objective evidence of record, such as may demonstrate how the terms are used and understood by persons of ordinary skill in the art, or by way of expert evidence of a person or persons of experience in the art.

In terms of general orientation and directional nomenclature, two types of frames of reference may be employed. First, inasmuch as this description pertains to drill bits that most typically are driven rotationally about an axis of rotation, and that advance along that axis; and although a well may not necessarily be drilled vertically, terminology may be employed assuming a cylindrical polar co-ordinate system in which the nominally vertical, or z-axis, may be taken as running along the bore of the well, and may be defined by the axis of rotation of the drill bit or the centerline of the bore. The circumferential direction is that through which rotational angles, angular velocity, and angular accelerations, (typically theta, omega and alpha) may be measured, often from an angular datum, or angular direction, in a plane perpendicular to the axial direction. The radial direction is defined in the plane to which the axial direction is normal, may be taken as having the centerline of the bore as the origin, that bore being taken as being, at least locally, the center of a cylinder whose length is many times its width, with all radial distances being measured away from that origin.

The second type of terminology uses the well head as a point of reference. While there is a local polar-cylindrical co-ordinate system, the bore need not be straight, and in horizontal or directional drilling is unlikely to be straight, but may tend to curve or deviate, and may do so deliberately according to deliberate steering. In this context, the bore may have an azimuth or compass direction, an angle of inclination (i.e., a dip angle), and may proceed on a given radius of curvature, which itself may vary. In this frame of reference, "upstream" may generally refer to a point that is further away from the outlet of the well, and "downstream" may refer to a location or direction that is closer to, or toward, the outlet of the well. In this terminology, "up" and "down" may not necessarily be vertical, given that slanted and horizontal drilling may occur, but may be used as if the well bore had been drilled vertically, with the well head being above the bottom of the well. In this terminology, it is understood that production fluids flow up the well bore to the well head at the surface. Finally, it may be desired to convert from this frame of reference to a grid or map reference with a depth, which, though formally a polar co-ordinate system (latitude, longitude, and depth) is, at the scale of interest essentially Cartesian (two horizontal grid references, plus a vertical reference for depth).

Figure 5:
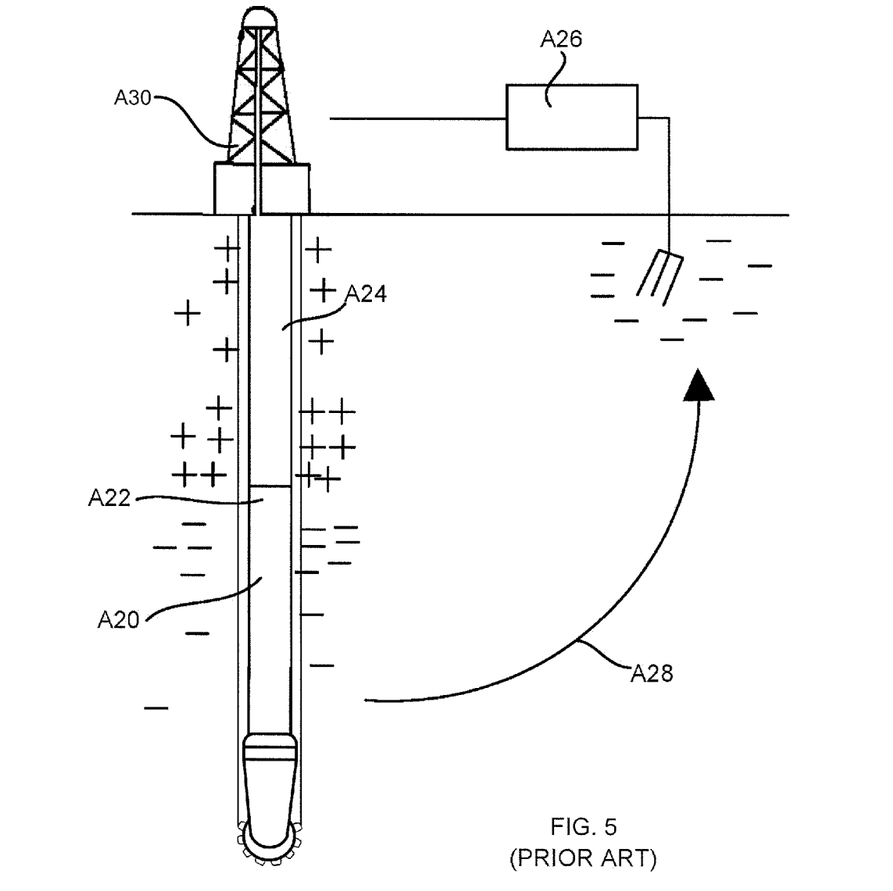
FIG. 5 is a conceptual schematic of a prior art system.

Considering first the prior art system, a classical electromagnetic (EM) telemetry transmission method used currently in the oil and gas industry in shown in FIG. 5. In conventional systems, the signal transmitter may be electrically isolated from the drill string. The Transmitter A20 creates potential difference across the isolating gap A22 in the drilling pipe A24. The potential difference such created is then detected at the surface with a detector, i.e., receiver A26. Receiver or detector A26 reads the difference in potential between the drilling rig A30 and ground. Since the drill pipe is made out of steel, the potential difference passes along the drill string from the gap A22 up to the rig. The signal created across gap A22 can be pulses, sinusoids or any other waveform. It is also commonly believed that the signal travel makes a closed loop from the bottom of the gap to the ground, and through the ground A28 to the detector (receiver A26), then through the drilling rig through pipe to the top of gap A22. In such an example, the signal transmitter may send out positively charged signals. A supply of negatively charged ions is then available not merely from the surrounding geophysical formation, but also from the drill string itself. Consequently the signal attenuates very severely, very quickly.

This method is widely used in drilling applications. However it has drawbacks. First, the close proximity of the positive and negative charges collected on either side of the isolating gap sub in the drill string, means that the charges are attracted to each other and tend to "leak", neutralizing themselves. This reduces the amplitude of the transmitted signal as seen at the surface. Second, it then follows that more power is required to be supplied by the signal transmitter to make the signal detectable at the surface. Enough charge has to be supplied for some of the charge to propagate to the surface. For the signal to be picked up at the surface, it has to be a very strong signal. Strong signals typically necessitate high power. However, since the signals are provided by a battery power source, a high power signal is problematic for battery life duration. In terms of average power, existing systems may be up to perhaps 40 w systems. An increased power requirement means bigger batteries, shorter duration, and more frequent changes. Third, the gap is expensive to make and makes the drill string weaker.

Figure 1:
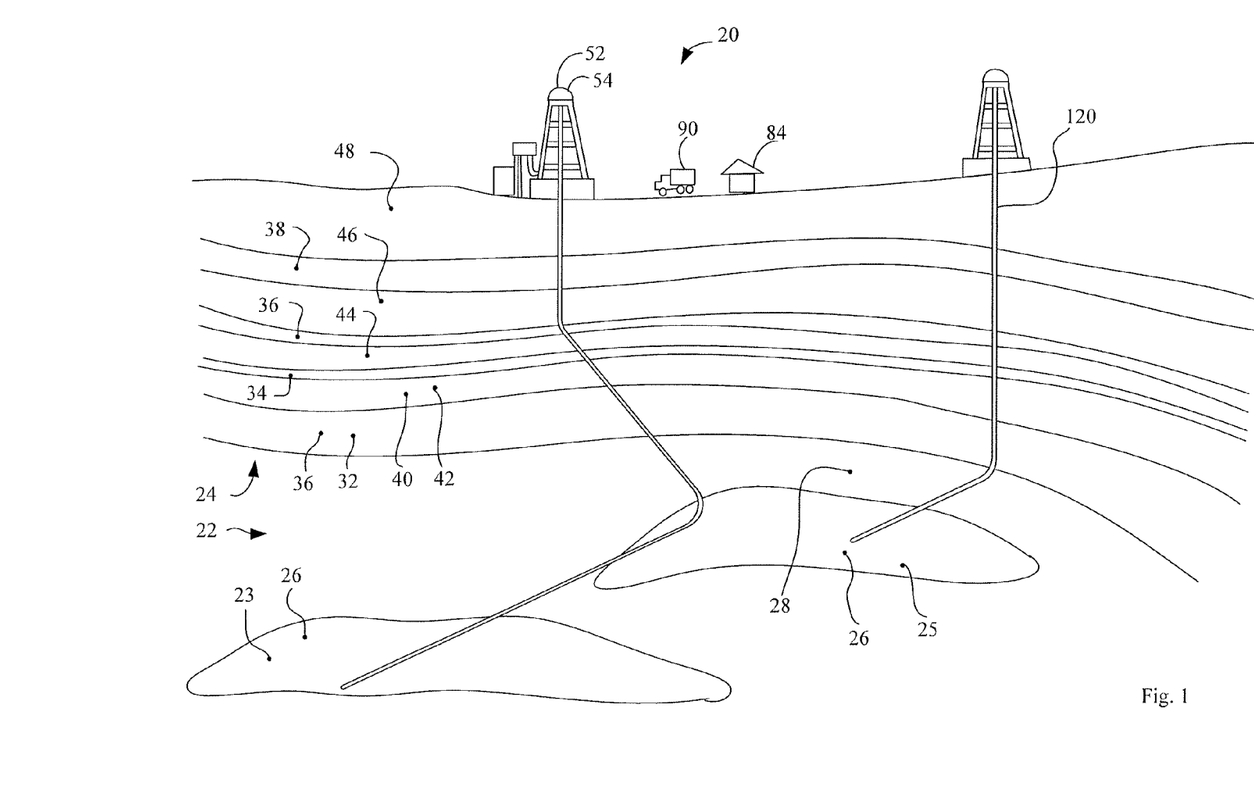
FIG. 1 is a general representation in cross-section of a geological formation establishing an example of a context to which the description that follows may apply, and includes an embodiment of drill rig downhole telemetry signalling apparatus incorporating aspects and features of the present invention.
Figure 2:
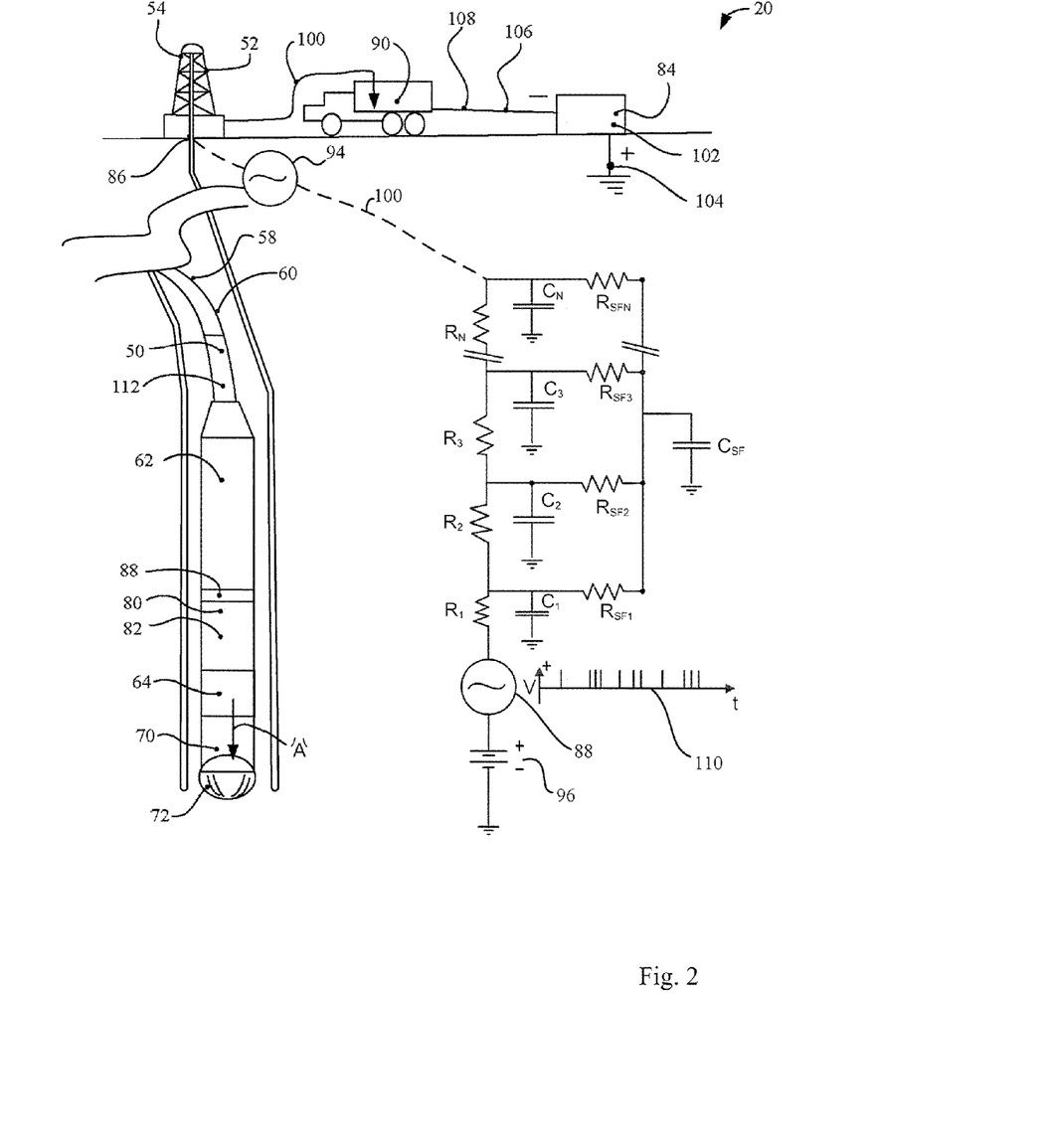
FIG. 2 is further representation of the signalling apparatus of FIG. 1, including an electrical conceptualization of the apparatus of FIG. 1.

Considering FIGS. 1 and 2, which are not drawn to scale, and which are intended to convey conceptual understanding, by way of a broad, general overview and only for the purposes of illustration, a geological formation is indicated generally as 20. Geological formation 20 may include a first mineral producing region 22, and a second mineral producing region 24 (and possibly other regions above or below regions 22 and 24). Region 22 may be below region 24, possibly significantly below. For example, region 22 may generally lie perhaps 1 km-7 km below the surface, whereas region 24 may tend to lie rather less than 1 km from the surface.

Region 22 may include one or more pockets or strata 23, 25 that may contain a fluid that is trapped in a layer 26 by an overlying layer 28 that may be termed a cap. The cap layer 28 may be substantially impervious to penetration by the fluid. In some instances the fluid in layer 26 may be a mixture having a significantly, or predominantly, hydrocarbon based component, and may include impurities whether brine, mud, sand, sulphur or other material which may be found in various types of crude oil. It may also include hydrocarbon gases, such as natural gas, propane, butane, and so on, and various impurities as may be. The fluid may be under low, modest, or quite high pressure. The vertical through thickness of the potential or actual production zone of region 22 may be of the order of less than 10 ft, to several hundred feet, or perhaps even a few thousand feet. The overburden pressures in this zone may be quite substantial, possibly well in excess of 10,000 psi.

Region 24 may include one or more mineral bearing seams, indicated generally as 30, and individually in ascending order as 32, 34, 36, and 38. It may be understood that FIG. 1 is intended to be generic in this regard, such that there may only be one such seam, or there may be many such seams, be it a dozen or more. Seams 32, 34, 36, and 38 are separated by interlayers indicated generally as 40, and individually in ascending order as 42, 44, 46, and an overburden layer 48 (each of which may in reality be a multitude of various layers), the interlayers and the overburden layer being relatively sharply distinct from the mineral bearing seams 30, and relatively impervious to the passage of fluids such as those that may be of interest in seams 32, 34, 36 and 38. It may be noted that seams 30 may be of varying thickness, from a few inches thick to several tens of feet thick. Seams 30 may, for example, be coal seams.

In one example, there may be a drill string 50, that extends from head end apparatus 52, which may be a drill rig 54 or a drilling truck, or similar equipment. In directional drilling, the drill bit may typically be mounted at the end of a coil that is conveyed down the bore from a drill rig located at the surface. The drill string is most typically 3½, 4, 4½, or 5 inches in diameter, and is made of sections of hollow pipe, usually ½ inch thick. Cleaning fluid, in the nature of water or drilling mud is forced down the inside of the hollow drill string under pressure, and flows back up the generally annular space about the drill string, and back to the surface. The deeper the well, the higher proportion of drilling mud as opposed to water. The drilling mud is driven by pumps, which are usually duplex or triplex pumps. In this example, the drill string may include conveying pipe 58 that is hollow, and through which drilling mud is pumped under pressure. There may be a regular pipe region 60, and a drill collar region 62. A drill string may have a very high aspect ratio of length to diameter, and a certain overall springiness or resilience both longitudinally and torsionally. The lower end of the drill string may include a number of sections of drill collars. Drill collars are often thick walled steel pipe sections about 30 ft long, and may have an inside diameter of 2¼ or 2½ inches, and an outside diameter of 5 or 6 inches. A drill string may have e.g., 18 or 24 such drill collars at the bottom end.

A mud motor 64 may be mounted at the downhole end of drill string 50. In one embodiment, the mud motor may have an inlet for drilling mud, a torque conversion section, which may include a helical impeller, or similar device, which impeller may drive an output shaft 70. A drill bit 72 may be rigidly mounted to the end of output shaft 70, so that when shaft 70 turns, drill bit 72 also turns. The mud motor body is rigidly mounted to the end of the drill string. In this embodiment mud motor body is a stator, having the same angular orientation about the longitudinal axis of the drill string as does the end of the drill string to which it is mounted. I.e., there is no relative rotation between the two. Output shaft 70 is hollow, and carries drilling mud in the direction of arrow 'A' to bit 72. For the purposes of our discussion, drill bit 72 will be assumed to include directional steering apparatus, and a steering signal receiving and actuating apparatus of conventional design.

In one embodiment of an aspect or aspects of the present invention there is an apparatus 80 for, or a method of, obtaining telemetry information from a well bore telemetry tool 82, Apparatus 80 is mounted between drill collars 62 and mud motor 64. Telemetry tool 82 may be an assembly that includes various sensors, as noted above and in the prior art, a small internal electrical power supply 74 such as batteries 76, and an output sending signal generator or signal module 78, that includes signal generator 88, connected to superimpose that output signal on the drill string. This internal power supply may be of a conventional nature. Batteries 76 provide power to electronics module 78. Electronics module 78 is used to charge up the charge storage medium, or media, which may be capacitors 92. When required, the switch 98 closes, allowing for the charge to flow through the metal body of signal transmitter 88, through the metal contact centralizers 102, 104 to the pipe 106. The charge storage media can have various forms. The generation of charge may be accomplished by several methods, not merely by using high voltage electronic converters. The end result is the same: accumulation of charge. Typically the charge will be a high voltage charge as compared to the ground reference inside the tool. The tool is tightly connected to the drill pipe, so that when the internal (typically solid state, high power) switch in the transmitter allows the flow of charge the switching is inside the tool, and there is no external spark. The charge flows smoothly into the tool. This may be contrasted with existing apparatus in which the signal transmitting sub is electrically isolated from the main structure of the drill string, and, in particular, where there is an electrically isolating gap between the next adjacent drill string section and the signal transmitting sub. The single polarity, single terminal apparatus described is free of such an electrically isolated gap.

Apparatus 80 may be referred to as a data-logging sub. It is relatively closely positioned to drill bit 72, and, in operation, it may be taken as being very far distant from the surface—more than a kilometer for example. As usual, it is desired to send a signal from the data-logging sub to the surface to tell the operator where the bit is located, and what its azimuth angle and orientation are, and perhaps other information that may be helpful—temperature, gamma radiation, resistivity, acidity, presence of particular substances, perhaps salinity, the apparatus being provided with such sensors as may be appropriate. A known way of doing this is to have the signal generator adjacent to the data-logger convert the data into a binary code. The binary code may not be "1" and "0" i.e. V+ and 0, but rather it may be more like a code—a short and a long, or, more pertinently, a series of pulses where the time between pulses carries the signal in either binary or hexadecimal form—i.e., a time gap of x means 0, 2x means 1, in hexadecimal the time difference can be up to 16x. The pulses may have the form of a wave or wave train, whether continuous or discontinuous. This signal is picked up by a sensor at the surface, which is listening for this code. In this situation, it is always assumed that a high power signal can always be sent from the surface to the data logging sub to initiate the sending of data, as required. In this example, the rate of data transmission is very slow—something of the order of 1 bit per second, i.e., one pulse per 250 milliseconds. Since the progress of the drill bit is generally also very slow in terms of distance of advance of the drill bit per unit time, this low rate of signal transmission is acceptable. In the apparatus herein, the baud rate may be faster, in the range of perhaps 1-200 pulses per second, or more narrowly, 5 to 100 pulses per second, or still more narrowly, 10-50 pulses per second.

In the apparatus of FIG. 1, drill string 50 is not electrically isolated from the data logging and transmitting sub. Instead the drill string is, as compared to the surrounding formation, a relatively low resistance, high conductivity, electrically conductive path to the surface. A mild steel pipe has much lower resistivity than the surrounding rock formation. The signal generator output is electrically connected to the drill string.

The signal generator may typically generate very short duration, pulses. The generator may generate an available free charge in the order of perhaps about 1 to 10 Coulombs for transmission. The charge applied per pulse may then be in the range of about 0.5 Coulombs to several (e.g., 5-8) Coulombs. The pulse may occur, on average in one embodiment, at a rate of one pulse every 10 milliseconds. I.e., the selected spacing sets the minimum pulse spacing between pulses if a pulse is sent at each opportunity. The receiver is looking for (i.e., polling for) a signal in each pulse space, and is counting the time between pulses in accordance with the code being used. As indicated in the schematic representation of FIG. 2, since the pulse amplitude is comparatively large, and the pulse duration is very short as compared to the spacing between adjacent pulses, the pulse train 110 may appear as a series of instantaneous vertical lines spaced time-wise. While the pulse spacing may be 10 ms, in another embodiment it may be one pulse every 50 to 100 milliseconds. In general, the frequency may be in the range of one pulse every 5 milliseconds to one pulse every 500 milliseconds. The pulse may not have a well-defined shape, in terms of having a controlled, square leading edge, since the pulse is really the rapid release of a pent up quantity of charge at a release voltage—this maximum charge transfer, is, in essence, pushing a large charge (0.5 to 10 Coulombs) of electrons pushed onto a steel pipe. The charge may have an instantaneous initial voltage (or spike) of perhaps 10000 V (+/−), or more, in the generator as an approximate value prior to release. On release into the drill string this value quickly diminishes. That voltage spike may, in one embodiment, be at least 1000 V, and in another embodiment may be in the range of 2000-20000 V. However, this signal will not be seen outside of the system, only an increase in charge will be detected. In one embodiment, the time constant for this signal is to be no more than 10 ms.

By using signals of a significant quantity of charge with very low time duration, the signal generator can either send more information per unit time or use less power, or both. At the instant of sending the pulse, there is a large potential difference between the well head signal receiver location and the transmitting station deep in the string. It is perhaps a misnomer to refer to a signal "receiver", since it is not "receiving" so much as merely detecting change in the presence of charge, (as compared to a normal nil, or approximately nil, datum) on the drill string. Nonetheless, the term "receiving" and "receiver" may be used herein. This charge, which may be taken as a positive charge (although plainly it could be either positive or negative) is sensible on the drill string until such time as it leaks away to the surrounding formation. The surrounding formation will be assumed to be, or to approximate for the purposes of this explanation, an infinitely large source or sink of positive or negatively charged ions, whichever as may be required.

The surrounding rock formation has essentially infinite mass, such that it is equivalent to a capacitor of infinite capacitance, having, in the context of the invention, a time constant for charging and discharging that is at least one order of magnitude longer than the pulse duration, and most probably at least two and possibly several orders of magnitude longer. Although the signal attenuates rapidly along the drill string, nonetheless, since the pipe has much higher conductivity than the surrounding formation, the signal can travel a long way along the pipe before the signal attenuation due to leakage to the formation makes the signal, namely the change due to the presence of the released charge, too small to detect.

In this context, "a long way" may be as much as 2 or 3 km. Therefore the apparatus may include repeater stations 94 along the drill strings at, say, 1 km intervals, possibly 1.5 km intervals. That is, the interval is comfortably less than the distance at which the signal is so attenuated (the signal extinction distance) that it can no longer be detected reliably. The interval may be one half or two thirds the signal extinction distance.

The baud rate may be pre-set in the signal generator at a suitable rate in light of the rate at which the signal attenuates, and the rate at which it subsequently leaks off to the surrounding geological formation. In terms of sending distance, even if 99% (or more) of the peak voltage potential of the signal leaks off, or is attenuated, before the signal reaches the receiver, nonetheless, that 1% may still be enough to sense (or, alternatively, sense, amplify and repeat at each repeating station). In that sense, the drill sting can be thought of as a small capacitor, (or series of small capacitors) with a low value resistance (or series of low value resistances) between the signal generator and the signal receiver, and the surrounding rock formation can be considered a very large capacitor with a somewhat higher resistance between it and the various elements of the drill sting. Thus the effective RC time constant of the drill string is much shorter than that of the surrounding geological formation (i.e., one or two orders of magnitude faster, at least). The faster the pulse dissipates into the surrounding geological formation, the sooner another pulse can be sent along the line, and thus the shorter may be the minimum spacing in time between successive wave fronts in a wave train of signals. Conceptually, the drill string charges up far more quickly than the rate at which charge can leak off into the surroundings. Thus a burst of charge onto the drill string cause a rapid reaction in sensed voltage potential before the charge can leak off. While the size of the pulse of charge in terms of the integral of (voltage×time) may be a function suited to the properties of the drill string, the time between pulses may tend to be more a function of the leakage rate. In one embodiment, that spacing of pulses may be at least one time constant of the drill string, in another embodiment it may be at least two time constants, in another embodiment it may be at least three time constants, in still another, at least 5 times constants. For the purposes of this description, one time constant corresponds to decay to 37% of the original peak voltage value, two time constants corresponds to 13½%, and three time constants corresponds to 5%. While instantaneous power in each pulse may be quite high, average power may be quite low. For example, in one embodiment, while the instantaneous power may be 100 W-500 W during a pulse, the overall average, or mean, power in the signal may be less than 5 W average power. In another embodiment overall power in the signal may be between ⅕ w and 2 w, at a baud rate of 20-100 Hz.

The transmitter, signal generator 88 places the information carrying signal on drill string. That information carrying signal is a time varying signal, a digitally generated, modulated pulse train code signal sequence based on a modulated periodic signal. That signal carries encoded information obtained from the sensors of telemetry tool 82, those sensors including attitude sensors (azimuth angle, dip) and other environmental or process sensors (temperature, pressure, acceleration, velocity, gamma radiation, resistivity) and so on. The receiving station 90, which may be a mobile communications truck, may also be located at the surface, as at well head 86, or at another more distant location, as may be, and may include signal processing circuitry operable to strip, or extract, or observe, the information transporting or carrying signal from the underlying carrier current. The main power supply 84 and the receiving station 90 may be mounted at the same location, whether in a fixed station or in a mobile unit, or may be separate. They are shown separately for conceptual explanation. In this example, the main power supply and receiving equipment is at the well head, where the signal is taken off the drill string.

Figure 3:
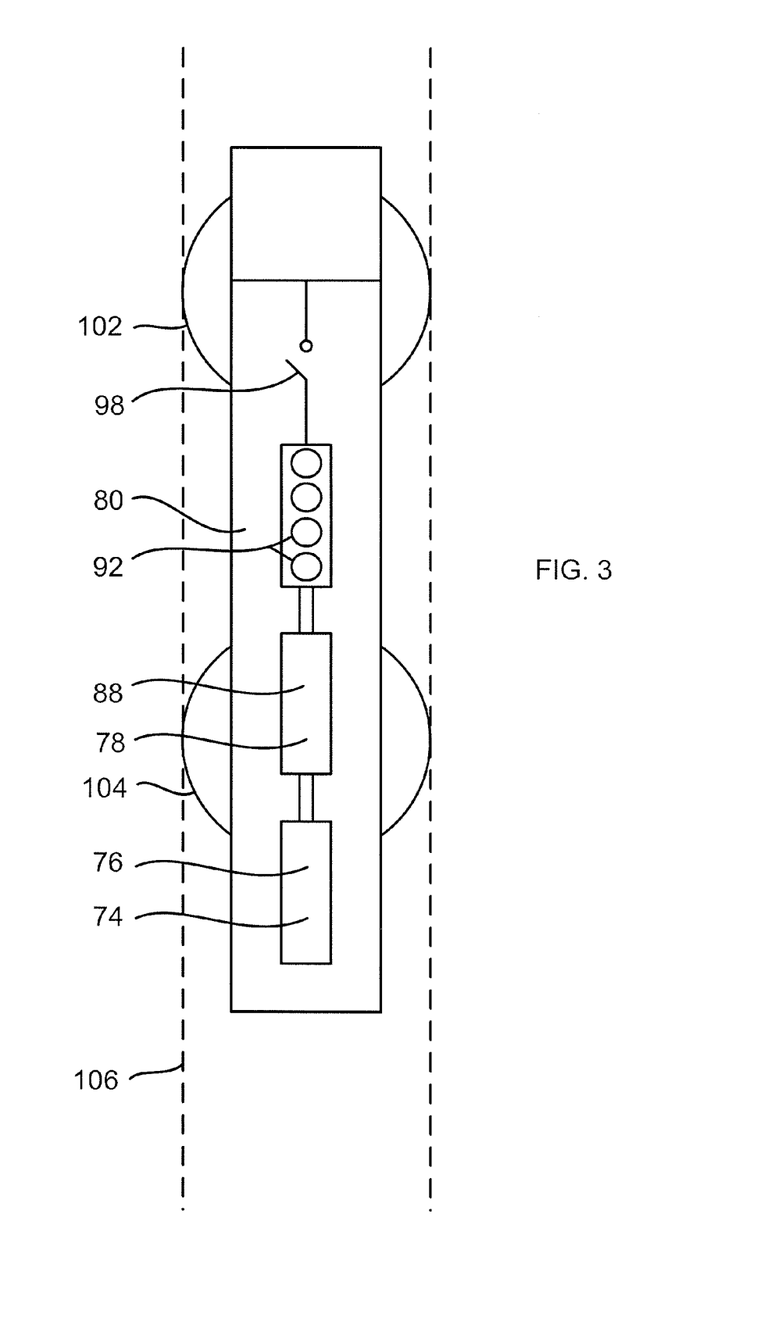
FIG. 3 is a conceptual schematic of the signalling apparatus of FIG. 2.

In that embodiment, the surrounding geological formation may be considered conceptually as an infinitely large capacitor, $C_{SF}$. The drill string may be considered, conceptually, as a relatively low resistance conductive path, identified notionally as 100, to the surface mounted monitoring equipment. In the low resistance path, the resistance of the first section of drill pipe above the signal generator is identified as $R_1$, the resistance of the second section of drill pipe as $R_2$, the resistance of the third section of drill pipe as $R_3$, and so on, the resistance of the nth section of drill pipe as $R_N$. Similarly each section of drill pipe has a respective capacitance, $C_1$, $C_2$, $C_3$, and $C_N$. Although geological formation 20 is a conductor of relatively large effective cross-sectional area, and although the drill sting "leaks" signal all along its length, the capacitance of the geological formation, $C_{SF}$, is so large that the miniscule overall charge of each pulse has no measurable effect on the potential voltage of the formation. Drill string 50 is, again, a relatively low resistance, high electrical conductivity path directly to the surface. The gap between drill-string 50 and the bore wall is, relatively speaking, predominantly an electrical insulator, or relatively high resistance path as compared to the drill string itself. This is conceptually represented by a series of resistors between each respective section of drill pipe and the surrounding geological foundation, $R_{SF1}$, $R_{SF2}$, $R_{SF3}$ ... to $R_{SFN}$ and so on. In each case, $R_1$, $R_2$, $R_3$, etc., are very small resistances, whereas $R_{SF1}$, $R_{SF2}$, $R_{SF3}$, etc., are very much larger resistances, perhaps of the order of four, five, six, or more orders of magnitude. That is, even if the flow of drilling mud, which is predominantly water, is considered to be analogous to quite salty brine, it may have an electrical conductivity in the range of, perhaps, 1 to 5 Siemens/meter (or, if less salty, possibly as little as 0.05 Siemens/meter). By contrast, mild steel such as might be used in the drill string, may have an electrical conductivity of the order of 500,000 to 600,000 Siemens/meter. Therefore, while there may be some electrical leakage into the drill string from the bore wall across the water-filled gap along the entire length of the drill string, nonetheless it may be expected that the signal will tend predominantly to travel along the drill string from the telemetry apparatus, namely telemetry tool 82, and on up drill string 50 to receiving station 90 at the surface. Similarly, the capacitance of each section of drill string is miniscule as compared to the surrounding geological foundation. $C_1$, $C_2$, $C_3$, etc., may each be very small, whereas the effective capacitance of the formation may be very large, perhaps several orders of magnitude difference.

While a dedicated electrical wiring harness and connector apparatus may be used, in one embodiment the apparatus relies only upon the electrical conductivity of drill string 50 itself and does not employ specialized connector fittings. The drill pipe itself is also free of electrical isolation from the drilling mud and the surrounding geological formation more generally. The telemetry (or other) signal runs upward along drill string 50 to the information signal receiving unit 90, where the information signal is observed. The detection equipment (e.g., receiving unit 90 at the well head) then receives and decodes the information. The decoded information is then analysed and suitable steering instructions are transmitted back down to drill bit 72 accordingly. Drill bit 72 then steers in the customary manner.

Thus, in the charge displacement signal transmission method described herein, there is no requirement for a gap in the drill string. The signal transmitter 88 sends a single polarity charge to the pipe. The accumulation of this charge propagates through the drilling pipe, rig and to the detector i.e., receiving station 90. This accumulation of charge creates a potential difference between the pipe and the ground. This difference is then measured by the detector. Note, there is no requirement of the closed loop signal flow here. The earth itself, simply because of the mass, provides the required potential level or sink for the excessive charge created by Transmitter.

In this description, it is understood that telemetry apparatus 80 employs a first or internal power source, such as batteries or a generator (e.g., driven by drilling mud flow) notionally indicated by battery 76, and a second or external power source, that may be placed near the surface of the ground whether in a truck or doghouse, that is relatively easily accessible, as described above for sending signals in the other direction (i.e., back down to the control sub for controlling steering of drill bit 72. A relatively small battery 76 inside the downhole tool 82 may then tend to be sufficient to function to provide the variable information signal to be transmitted to the well head. This may tend to overcome, or in some way address the problem of downhole power consumption that tends typically to be a factor limiting telemetry tool operation.

Although the description has been made in terms of the transmission of an information signal encoding the observations of monitors for directional angle (N, S, E, W, etc.) dip angle, temperature, pressure, and so on, the apparatus can also be used to carry instruction signals back to the drill bit. Since the instruction signal is provided from the surface, the need to employ a relatively high power signal sending device is less problematic. However the carrier current may still provide an avenue for the instructional signal.

Recapping the description, a telemetry tool, or assembly, 80, is placed in a drill string adjacent to a drill bit 72. Telemetry tool 80 includes position and direction sensors, a power supply, a signal receiver and a signal emitter. An external base, or receiving, or detecting, unit, may be mounted adjacent to the wellhead and in electrical connection or communication with the drill string in a manner permitting it to sense charge (i.e., electrical potential), and changes of charge, thereon. The geological formation may not tend conceptually to resemble a large current conductor so much as a large capacitor. The tendency of the geological formation to behave like a capacitor may vary from location to location. In some embodiments the geological formation may behave much less like an ideal capacitor, and more like a device that is in part like a capacitor, and in part like a resistor, such that it may resemble what might be termed a "leaky capacitor". The exponential decay time constants for the surrounding rock formation RC circuits may be of the order of 5 or 10 or 20 minutes. The effective RC of the drill string may be of the order of less than 20 ms. The drill string defines a relatively low resistance, much lower capacitance conductive path for the telemetry data logging (or other informational) signal. The signal generator of the telemetry unit superimposes a coded, time-varying signal of high amplitude, low duration pulses on the drill string. The time varying signal may include a recognition sequence, followed by a data string. The data string may include information pertaining to compass direction, azimuth dip, rotational speed, acceleration in any of three axes, and so on. The base or receiver unit detects the signal on the drill string, and reads the code. This system may tend to permit the telemetry tool to operate at relatively low power.

Thus, in this embodiment, a telemetry tool, or assembly, 80, is placed in a drill string adjacent to a drill bit 72. Telemetry tool 80 includes position and direction sensors, a power supply, a signal receiver and a signal emitter. An external base unit, may be mounted on the surface.

In a traditional "two terminal" data logging signal transmission arrangement, the intention is that a current flow from the sender and through the receiver and then back to ground to complete a circuit. The portion of the circuit between the sender and the receiver is isolated from ground—which, in practical terms, may mean that special electrical connections are required between drill string pipe sections. In the present "charge displacement" method, there is a "one terminal" system such as the example described herein. In this one terminal system it is, at least conceptually, unimportant whether there is a flow of current to or through, the monitoring device. The one terminal system is not based, conceptually, on the flow of current, but rather on an ability to detect the presence of charge. In this "single polarity" system, the apparatus monitors for the presence of charged ions on the pipe, as compared to a normal essentially discharged ground state of the pipe. Conceptually, in a two terminal system the receiver is a participant. In the one terminal system described, the receiver is conceptually a bystander: like an observer, or monitor, or sensor, some distance away who can see whether a light bulb flashes on or off, without themselves necessarily being part of the electrical current path of the light bulb circuit. Another analogy is to a water catchment with multiple drains. A sudden rush of water into the tub or trough can be observed by someone at the far end of the trough who sees the water level rising, temporarily, without the observer necessarily getting wet. The rush of water (i.e., charge) then leaks away through multiple drains, before there is another surge.

Leakage of signal is generally undesirable in a two terminal system where signal attenuation reduces effective signal distance and increases power requirements. Therefore, as noted above, special steps may be taken to provide insulated conductors. In the one terminal system described, however, leakage is what permits the drill string to return to its normal, or neutral, or datum state, ready for the next pulse. In that sense, the surrounding geological formation defines a large, diffuse "second terminal" ground to which the charge leaks, and the leakage is part of the normal, expected, function. Special electrical isolation is not only not required, but rather it may be detrimental, depending on the circumstances. On one hand this leakage to ground is what determines the effective signal sensing distance, or relay signal spacing distance, and so a relatively low leakage rate is beneficial. On the other hand, if leakage is too slow, the baud rate is reduced because the time period between pulses waiting for the pipe to return to its uncharged datum state must be longer.

Similarly, each pulse of charge on the drill pipe is achieved by releasing stored up charge from the signal generator, suddenly, onto the drill pipe assembly. This needs to be done quickly, so that the drill pipe becomes, in effect, temporarily "flooded" with charge such that the presence of the charge can be detected at the distant receiver before that flood, or surge, of charge leaks away. To that end, to the extent that there is resistance in the signal generator or the connection to the drill string, if the charge is under a higher initial voltage, the speed at which it "floods" the drill pipe may be greater, and so, the effective sensing distance may also be greater.

In an alternate embodiment, a carrier current, or carrier potential, may be imposed on the drill string to enhance propagation of the signal charge along the drill string. The carrier current may have the same polarity as the charge pulses. The carrier current may be imposed by a current generating source outside the drill string, e.g., at the surface of the geological formation, with the drill string acting as the conductor of lowest resistance. A generator operating as the surface may tend not to have the size or power constraints of a battery powered unit in the drill string, and may run at as much as a few hundred watts, rather than 5-10 W. The charge pulses are then placed on the drill string, the pulses being superimposed on the carrier current. Alternatively, just prior to signal transmission, the generator (at the surface) switches off, and the charge leaks into the surrounding formation, charging the area adjacent to the pipe. Then the signal is sent on the pipe, where the like polarity charge in the surrounding formation may tend to encourage the signal to remain on, and travel along, the drill string. In a further alternative, the generator may establish a steady voltage potential, opposite in polarity to the signal polarity, and may continue running as the signal is sent.

Figure 4:
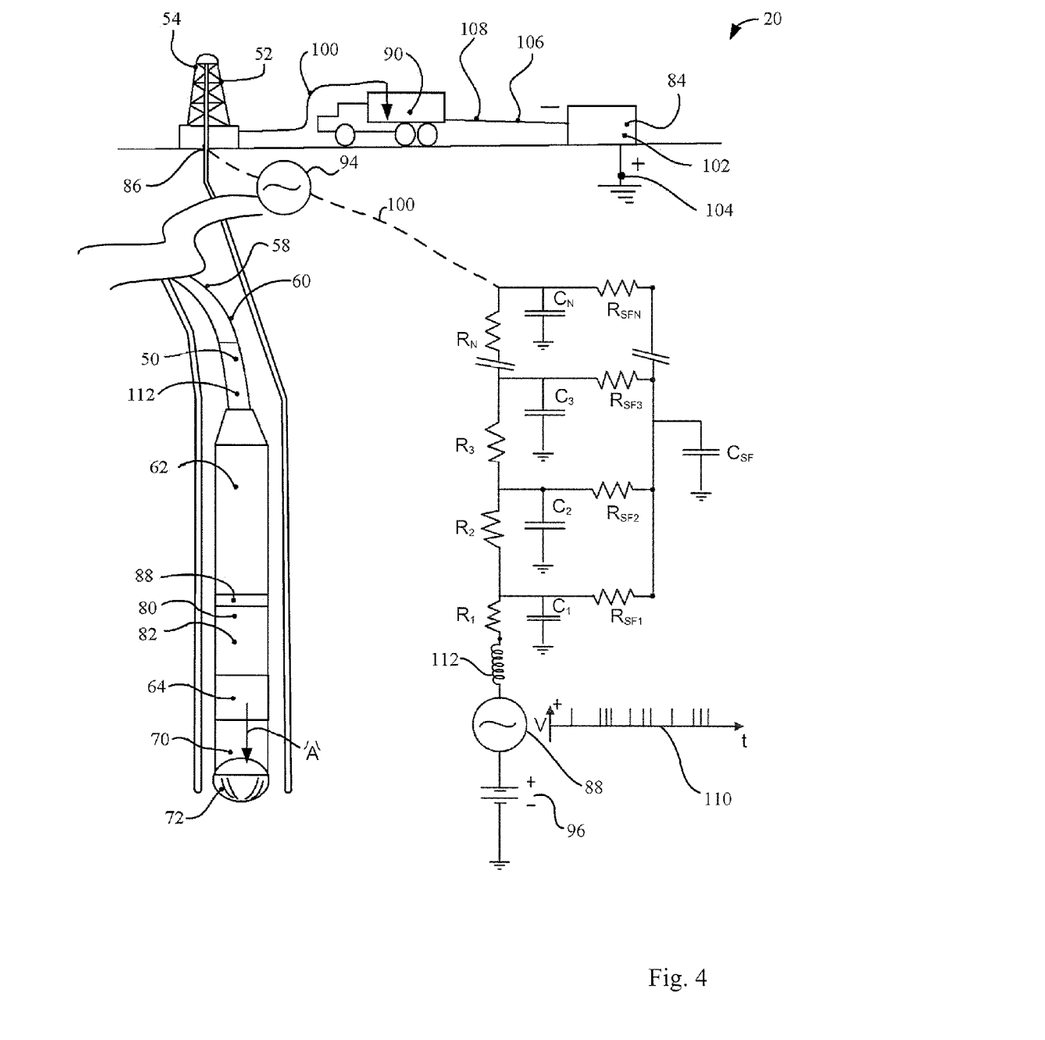
FIG. 4 is an alternate representation of a signalling apparatus shown in a different embodiment to that of FIG. 2.

As has been observed, unwanted noise often appears to have the ability to travel while desired signals tend to attenuate quickly. Noise is usually considered parasitic, and can be quite difficult to rid from a system. In that light, in some embodiments, rather than fighting the noise, the tendency preferentially to carry noise in the natural frequencies of the drill string is used to transmit information. The pulse generator then becomes a noise generator, and the receiver becomes a noise detector that is used to detect changes in the noise level sensed at the receiving end. The individual signal pulses may be considered pulses of wide band noise imposed on the drill string. While it may be that the pulse is in some sense "square", like the sharp wave front of a square wave, or step function pulse, the pulse may also be non-square. It is not necessary that the input signal be a clean square, saw-tooth, or sinusoid. It can be a "burst" of charge. In one embodiment, such as shown in FIG. 4, a coil 112 may be used on the output of the charge source to conduct the charge to the drill string, the high volt pulsed discharging current forms a resonant LRC circuit with its environment, in this case the drill string pipe. There may be a signal, such as a 16 MHz signal, fed from the coil onto the drill string in a "burst". The burst may have 1 us duration (+/−). This short duration burst may then excite a decaying resonant ringing in the pipe.

In general, a drill string has one or more resonant modes, depending on length, pipe thickness, and other factors. The portion of the signal pulse falling in the frequencies of the resonances (typically one or a small number of resonant frequencies may be dominant), the dominant mode natural frequencies of the pipe may tend to carry, or propagate, for a long distance while the non-resonant frequencies attenuate more quickly and at shorter distances. In effect, the sudden wideband noise pulse causes the drill string to "ring" at its resonant frequency, or frequencies, and the ringing in the resonant frequencies can be detected at greater distances, more easily, than other frequencies, such that those frequencies become preferential signal carriers. Since there is relatively little electrical noise downhole, the detection of the burst will tend to be facilitated. The burst may be detected by looking for the dominant frequency (or frequencies) of the burst or by analyzing the instantaneous noise levels: the burst will tend to raise the noise floor, i.e., the mean level of apparent noise detectable on the string. Thus a receiver operating across a band of frequencies can monitor, or receive, the signals carried along the drill string in the dominant natural frequencies, each new pulse or "ring" corresponding to a pulse originating with the sending unit. That is, although only portions of the input signal may be heard by the receiver, the issue of importance is not that the receiver should detect all of the frequencies, or that the received signal have the same frequency v. amplitude distribution as the input pulse, but rather that it detect that there has been a pulse, for which detection of the resonant frequency-carried portions of the pulse is sufficient. That is, it is not the shape of the input pulse that matters to the receiver, but that there has been an input pulse. So in this "resonant burst" embodiment, the method includes imposing a pulse, which may be a wide band pulse, on the drill string at the one end (e.g., the telemetry signal sending end) and receiving a signal at the other end in, or predominantly in, the drill string resonant frequency or frequencies in which the signal propagates most easily. The timing of the pulses may then carry the telemetry signal, as before, a typical frequency range of pulses being of ½ Hz to 8 Hz, where the resonant frequency signals may tend to die out within 10-20 ms, and the duration of the pulses and the time spacing between the pulses is controlled by the sending unit. The signal is thus sent by deliberately creating noise in the drill string, but doing it over controlled time intervals, where the spacing of those controlled time intervals is also controlled.

Various embodiments have been described. Since changes in and or additions to the above-described examples may be made without departing from the nature, spirit or scope of the invention, the invention is not to be limited to those details but only according to purposive construction as required by law.

I claim:

1. A method of transmitting well-bore down hole data comprising using a well-bore downhole data logging signal transmission apparatus to transmit data from a signal transmitter to a receiver, the signal transmission apparatus having a signal transmitter sub mounted to an electrically conductive drill string adjacent to a drill bit thereof;

a receiver mounted at a drill bore head location;

said signal transmitter sub including a signal transmitter;

said signal transmitter being operatively connected to place coded electrical signals on the electrically conductive drill string;

said receiver mounted in operative connection to sense the presence of the transmitted coded electrical signals; and said signal transmission apparatus being operable to cause pulses of charge to be placed on the drill string, said pulses having a duration of less than 10 ms; and the pulses have an initial peak voltage, and said method includes spacing pulses of data, said spacing including inhibiting transmission of a subsequent pulse until electrical voltage potential on said drill string adjacent to said signal transmitter has decayed to less than 37% of said peak voltage.

2. The method of claim 1 wherein said method includes inhibiting transmission of subsequent pulses until voltage potential on said drill string adjacent to said signal transmitter has fallen to less than 13.5% of said peak voltage.

3. The method of claim 2 wherein said method includes inhibiting transmission of subsequent pulses until voltage potential on said drill string adjacent to said signal transmitter has fallen to less than 5% of said peak voltage.

4. The method of claim 1 wherein the electrically conductive drill string is free of electrical isolators between (i) successive sections of the drill string; and (ii) between the drill string and the surrounding geological formation.

5. The method of claim 1 wherein the apparatus is mounted in a drill string, and the drill string is free of an electrically isolated gap between the transmitting sub and the drill string.

6. The method of claim 1 wherein a carrier current is placed onto the drill string in a polarity and form aiding transmission of the pulses of electrical charge.

7. The method of claim 1 wherein pulses of noise are imposed on the drill string over controlled pulse periods, with controlled spacing between the pulses.

8. The method of claim 1 wherein the signal transmission apparatus includes sensors for observing any of (a) compass direction; (b) azimuth angle; (c) temperature; (d) acidity; (e) salinity; (f) gamma radiation; and (g) resistivity, and said signal transmitter sub is operated to send data obtained from any of said sensors.

9. The method of claim 1 said signal transmitter of said signal transmitter sub emits a pulse train having a mean power consumption of less than 5 w.

10. The method of claim 1 wherein said signal transmitter of said signal transmitter sub has a power consumption of between 0 and 2.5 w.

11. The method of claim 1 wherein said signal transmitter is operated to release signal charge pulses onto the drill string at least one of (a) while a carrier current is on said drill string; and (b) after a carrier current has been turned off following charging of a surrounding geological formation.

12. The method of claim 1 wherein said pulse has a time duration of less than 5 ms.

13. The method of claim 1 wherein there is a signal repeater mounted along the drill string intermediate said signal transmitter and said signal receiver.

14. The method of claim 1 wherein said signal transmitter has a baud rate in the range of 20 to 200 pulses per second.

15. A downhole telemetry apparatus that includes a signal source connected to place a series of controlled duration electrical charge pulses on a drill string, and apparatus mounted to detect ringing in the drill string caused by such pulses.

16. The downhole telemetry apparatus of claim 15 wherein the signalling apparatus includes a coil connected to conduct the pulses onto the drill string.

17. The downhole telemetry apparatus of claim 15 wherein the apparatus and the drill string form an LRC decaying resonance system.

18. The apparatus of claim 17 wherein said signal source is operable to place well logging data on the charge pulses in the LRC decaying resonance system.

19. The apparatus of claim 15 wherein said signal source is operable to place well logging data on the electrical charge pulses.

20. A method of use of the downhole telemetry apparatus of claim 15 wherein said method includes imposing a train of pulses on such drill string, and sensing the ringing in the natural frequencies of the drill string associated with such a train of pulses.

21. The method of claim 20 wherein said method includes transmitting well logging data on the pulses.

* * * * *